Jan. 12, 1971  D. R. RORER  3,553,931
PACKAGE-TRIMMING APPARATUS FOR A SKIN-PACKAGING MACHINE
Filed July 27, 1969  3 Sheets-Sheet 1
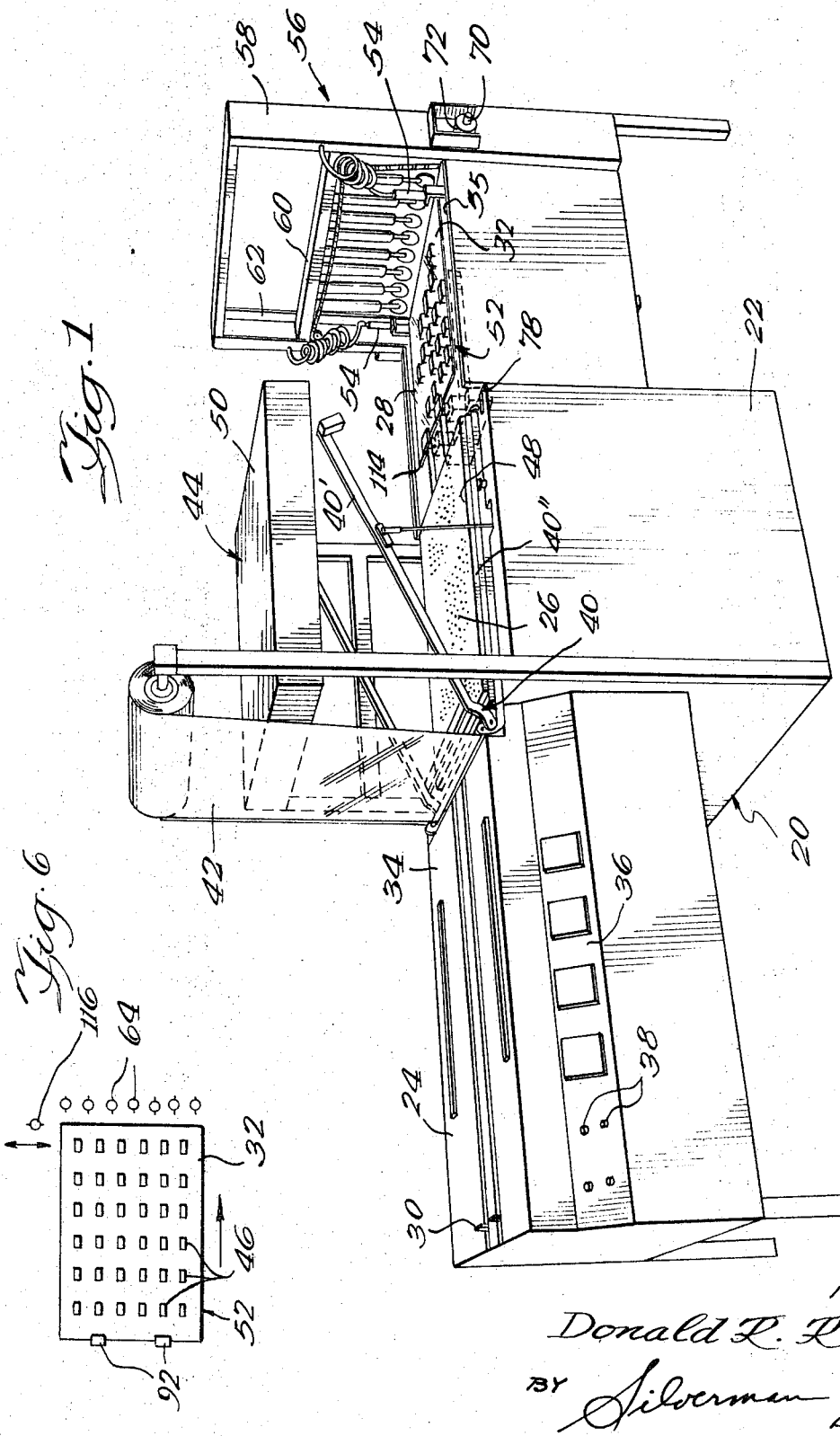
INVENTOR
Donald R. Rorer
BY Silverman & Cass
ATTORNEYS

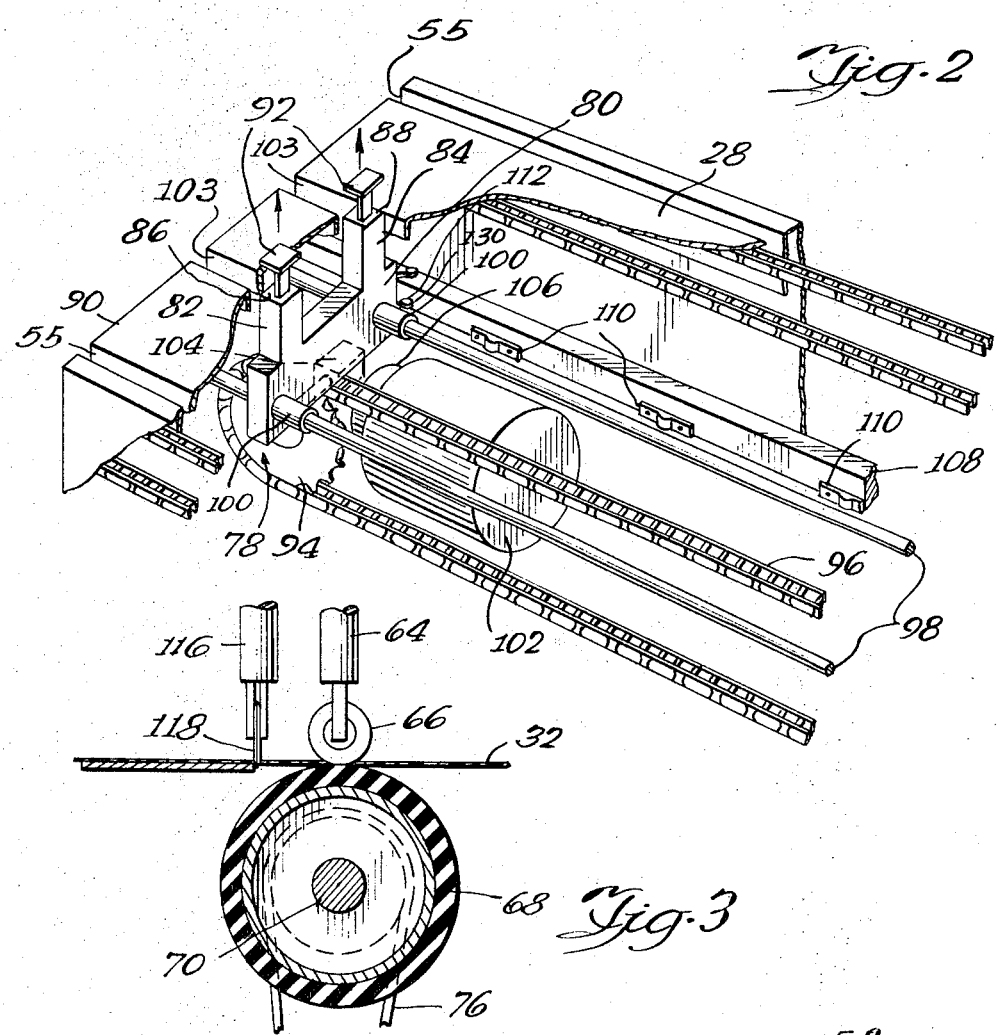
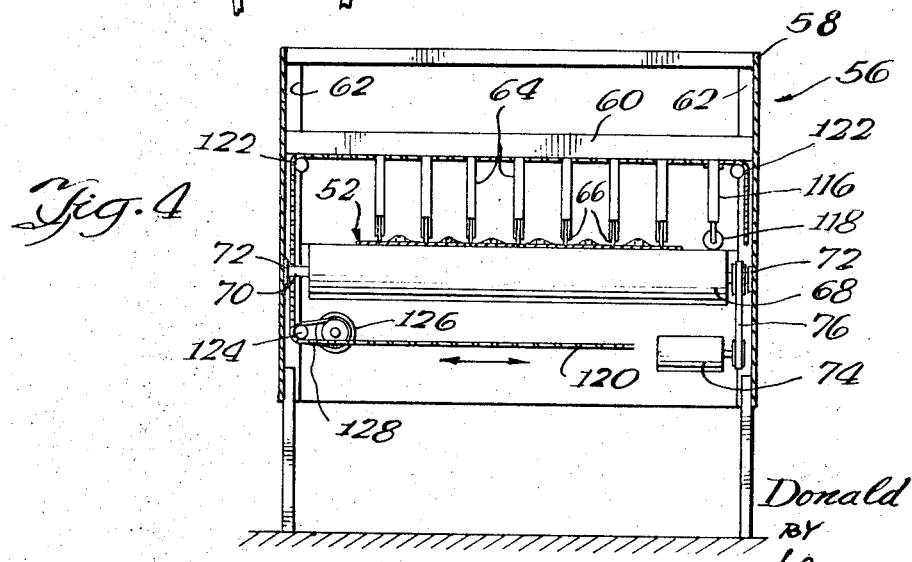

United States Patent Office 3,553,931
Patented Jan. 12, 1971

3,553,931
PACKAGE-TRIMMING APPARATUS FOR A SKIN-PACKAGING MACHINE
Donald R. Rorer, Lake Bluff, Ill., assignor to Stone Container Corporation, Chicago, Ill., a corporation of Illinois
Filed June 27, 1969, Ser. No. 837,238
Int. Cl. B65b 31/00
U.S. Cl. 53—112
10 Claims

ABSTRACT OF THE DISCLOSURE

A package-trimming apparatus for use with a packaging machine which encases a plurality of articles on a single base pad or substrate in a thin film of thermoplastic material to form a large composite skin package. The apparatus has a package-advancing means for moving the initially formed composite skin package through a trimming station having sectioning means to divide same into discrete or individual skin packages. The package-advancing means includes a pusher bar means coupled to a torque motor responsive to the amount of force exerted back against the pusher means so as to effect a slip or play in the pusher bar means whereby to prevent undesirable buckling of the substrate during sectioning thereof. A program bar and switch controls intermittent transverse slitting of the substrate automatically as the composite package is moved longitudinally through the said sectioning station.

CROSS-REFERENCE TO RELATED PATENT AND APPLICATION

A skin-packaging machine of the general type with which this invention is concerned is disclosed in my U.S. Pat. No. 3,377,770 entitled, "Skin-Packaging Apparatus." The invention also is related in subject matter to that of my pending application, Ser. No. 732,768 filed May 28, 1968, for the invention entitled, "Automatic Package Handling Apparatus for a Skin-Packaging Machine." The present invention is adapted also for use with skin-packaging apparatus of the type which is not described and claimed in said patent and pending patent application. This patent application and said patent and pending application are owned by the same assignee.

BACKGROUND OF THE INVENTION

Field of the invention

This invention relates generally to packaging machines for encasing articles positioned on a base pad or substrate within a thin protective layer of thermoplastic film material which is vacuum or otherwise formed over the article or articles, such machines being referred to in the trade as "skin-packaging machines" and more particularly to novel package-trimming apparatus which automatically will section the initially formed composite package into discrete or individual packages.

DESCRIPTION OF THE PRIOR ART

The field of skin-packaging, as discussed in my prior patent and copending application, has experienced substantial growth in the area of relatively small consumer items for self-service merchandising, as well as in the marketing and sale of larger industrial articles. This expansion and rapid growth has necessitated development and improvement of automatic apparatus and devices to perform operations for successfully producing skin packages in mass production fashion. In my copending application, I described an automatic package handling apparatus designed to expedite the removal of a composite skin-package assembly from the vacuum bed or work area of the skin-package apparatus for subsequent feeding to a package-trimming station or other work station where the composite package containing a plurality of articles encased thereon could be handled, as desired. Where a trimming station was contemplated, the composite package carrying a plurality of articles on a single substrate or pad would be divided into discrete or individual packages each carrying a single article.

In order to section a composite skin package into individual package units, the composite assembly must be lifted from the platen or work bed and moved to an adjacent station for operation thereon by a plurality of cutting or sectioning blades. While there have been some prior attempts at devising substrate sectioning means, such as taught by U.S. Pat. No. Re. 25,466, these attempts do not completely solve the problem at hand. For example, the sectioning apparatus of Pat. No. Re. 25,466 performs the cutting operations merely with the use of cutting blades and a cutting roller. However, in order properly to perform the sectioning operation, the trailing edge of the substrate must be braced so that the substrate will not slide relative to the cutting blades as the sectioning operation is performed.

While this bracing procedure is necessary to prevent sliding of the substrate during the sectioning operation, undesirable side effects arise due to such bracing. There is a tendency for the substrate to buckle at its center when excessive force is exerted against the substrate part being cut. Prior to the herein invention, insofar as I am aware, no satisfactory means have been developed for properly bracing the substrate while, at the same time, compensating for the tendency of the substrate to buckle during cutting.

Further, it is necessary to be able to perform both a longitudinal and transverse cutting operation on the composite skin package in order to sever same into individual packages. Although prior apparatuses have employed separate manual transverse cutting or manually controlled transverse package-sectioning means, to my knowledge an automatic, program-controlled, transverse cutting system in conjunction with longitudinal sectioning means has not been achieved successfully in the prior art.

Accordingly, it is a primary object of the invention to provide an automatic package substrate advancing and sectioning apparatus for combination with a skin-packaging machine which enables the composite skin package automatically to be cut or sectioned into a plurality of individual package units, which apparatus includes means for preventing sliding of the substrate relative to the cutting blades and also prevents buckling of the substrate while the sectioning operation is being performed.

Other objects and advantages of the invention will occur to those skilled in the art as a description thereof is evolved hereinafter.

SUMMARY OF THE INVENTION

The invention is characterized by the provision of automatic substrate advancing and sectioning apparatus in combination with a skin-packaging machine which enables the composite skin package to be rapidly and effectively sectioned in a continuous operation following removal from the machine work area. The substrate sectioning apparatus utilizes a pressure bar or pusher which pushes the substrate past the cutting blades of a slitter device. The pusher bar is controlled by a torque motor having brake and clutch arrangement which responds to the amount of force exerted back against the pusher bar during sectioning of the substrate. Thus, if a force in excess of that determined to maintain the substrate flat during sectioning is exerted against the pusher bar, there results a play or sliding movement in the pusher bar which prevents buckling of the substrate by reason of such excessive force being exerted.

This sectioning or trimming apparatus of the invention also utilizes a cam-operated switch program means which automatically will control intermittent transverse sectioning of the composite skin package to produce the desired individual package units, said means being adjustable for sectioning different size individual packages as dictated by the size of the article packaged.

BRIEF DESCRIPTION OF THE DRAWINGS

FIG. 1 is a perspective view of a representative skin-packaging machine having the automatic trimming apparatus embodying the invention associated therewith in operative position.

FIG. 2 is a fragmentary perspective view, partially in section, illustrating the slitter infeed station af the apparatus illustrated in FIG. 1 with the pusher bar means.

FIG. 3 is a vertical sectional view taken through the trimming apparatus of FIG. 1.

FIG. 4 is an elevational view of the trimming station of the apparatus illustrated in FIG. 1.

FIG. 6 is a diagrammatical plan view of a composite skin package in position on the slitter infeed means of the trimming apparatus illustrated in FIG. 1 prior to slitting thereof.

DESCRIPTION OF THE PREFERRED EMBODIMENTS

Figure 5:
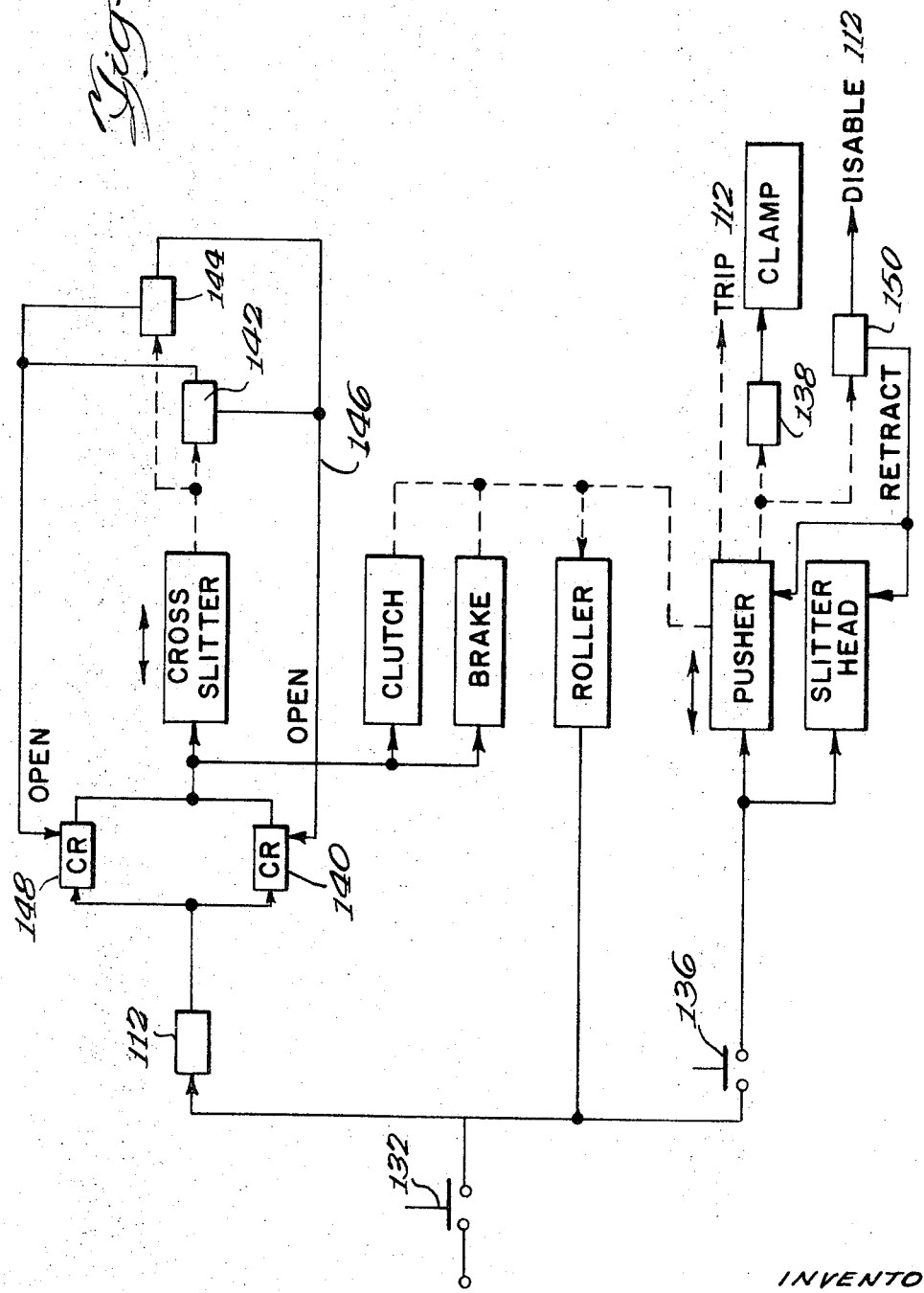
FIG. 5 is a schematic diagram of a portion of the control and electrical circuitry of the apparatus in accordance with the invention.

Referring now to the drawings, in FIG. 1 there is illustrated a skin-packaging machine designated generally 20 constructed in accordance with said copending patent application. The machine 20 includes a base 22, which has a vacuum-forming infeed station 24, a work area or vacuum-forming station 26, and a package-removal station 28. The package-removal station 28 also serves as the infeed station to the trimming apparatus of the invention.

The vacuum-forming infeed station 24 is provided with an infeed pusher means 30 constructed and arranged to slide a base pad 32 positioned flat on the upper surface 34 onto the bed of vacuum station 26. A control panel 36 having control buttons 38 is provided for operating and monitoring the various steps of the skin-packaging operation. While the base pad 32 is being pushed toward the vacuum-forming station 26, the drape frame 40 with plastic sheet or film material 42 clamped between the edges thereof will have been raised to a position immediately below the heater assembly 44. The base pad 32 with associated articles 46 is pushed onto the vacuum bed or platen 48 of the vacuum-forming station 26 preparatory for the vacuum-forming operation.

The drape frame 40 comprises upper and lower frame sections 40' and 40'', respectively. In FIG. 1, the drape frame 40 is open preparatory to receiving and clamping the plastic film 42 between the frame sections thereof. After this is done, the drape frame 40 is raised to a position below the heater 44 (not illustrated) so that the clamped section of the plastic film 42 is positioned proximate the oven 50. In this position, the plastic sheet material 42 can be heated to a proper temperature to soften the same in preparation for the vacuum-forming step. It is to be understood that the construction of the vacuum-forming station illustrated in FIG. 1 is representative only, it being contemplated that the invention may be utilized with skin-packaging machines of a type other than that illustrated.

Following heating of the plastic film 42 to its vacuum-forming temperature, the drape frame 40 is lowered into surrounding engagement with the vacuum bed 48. The vacuum-forming step is performed by means of an air-evacuating system (not shown) housed in the base 22 which is actuated to evacuate the volume of space under the heated plastic sheet material 42 so as to draw the film downwardly into surrounding engagement with the articles 46 and into laminar contact with the upper surface of the base pad as disclosed in Pat. No. 3,377,770. There is produced a composite package 52 consisting of a single large base pad or substrate 32 and associated articles 46 encased thereon in a spaced apart and aligned relationship.

To perform additional operations on the composite skin package 52, package 52 must be removed from the vacuum-forming station 26. Apparatus for accomplishing this is disclosed in my copending application which also is illustrated in part in FIG. 1 of the herein specification. A pair of clamps 54 is provided to grasp the lead corners of the substrate 32 and move it to the package-removal station 28. At this time, the unused portion of plastic film 42 will be severed adjacent the trail edge of the base pad 32 by a suitable severing means, such as a knife blade (not shown). The clamps or lifter members 54 are mounted for controlled movement along parallel guideways 55. The clamps 54 move between a first limit point adjacent the vacuum-forming station 26 to a second limit point adjacent the substrate sectioning station, as illustrated in FIG. 1. Immediately prior to reaching the second limit point of movement, the clamps 54 automatically are opened by the overall control system for the machine to release the package assembly 52 and deposite the same on the slitter infeed station 28. At this time, the automatic substrate advancing and sectioning apparatus of the invention is placed in operation.

The advancing and sectioning apparatus of the invention is designated generally 56 in FIGS. 1 and 4. The apparatus 56 includes a slitter head frame 58 secured to the downstream end of the slitter infeed station 28 considering movement of the package from left to right in FIG. 1. A slitter head control bar 60 slidably is mounted in two oppositely facing channel formations 62 of the frame 58 for movement in a substantially vertical direction. The control bar 60 carries on the underside thereof a plurality of slitter members 64, each of which mounts a circular slitter blade 66 with the blade facing in a direction substantially parallel to the longitudinal axis of the skin-packaging machine 20. Positioned on the slitter head frame 58 directly below the slitter blades 66 is a hardened roll 68 carried by an axle 70 which is journalled at opposite ends thereof in the frame 58 at 72. A motor 74 is connected by a belt 76 and suitable pulleys to drive the hardened roll 68.

As seen in FIGS. 1 and 2, a pusher bar assembly designated generally 78 is provided for bracing and advancing the composite skin package 52 through the substrate sectioning apparatus 56. The assembly 78 is positioned below the slitter infeed station 28 and includes a pusher carriage 80 having two upstanding extensions 82 and 84, the upper surfaces 86 and 88 of which extend above the upper surface 90 of the slitter infeed station 28. A pair of air or solenoid-operated clamps 92 are mounted in the extensions 82, 84. The pusher carriage 80 is connected by suitable structural members (not shown) to a sprocket gear 94 below the slitter infeed station 28, and a sprocket chain 96 couples the gear 94 to a reversible pusher carriage motor 102. The pusher carriage 80 is mounted for movement on a pair of guide rods 98 which extend the length of the slitter infeed station 28. Suitable guide means 100 are provided on the carriage 80 to permit sliding movement of the carriage along the guide rods 98. A pair of pusher carriage grooves 103 are provided in the upper surface of infeed station 28 to permit the extensions 82, 84 to extend above the surface 90.

The pusher carriage control motor 102 includes a brake arrangement 104 and a clutch control 106. A program control bar 108 with adjustably mounted cams 110 is positioned adjacent the pusher carriage 80 and extends parallel to the guide rods 98. A cam-operated switch follower 112 extends from the side of the pusher carriage 80 in contact with the program bar 108 and in line with the cam members 110.

In operation, the composite package 52 is removed from the vacuum bed 48 and deposited on the slitter infeed station 28 by the clamps 54. The trailing edge 114 of the package 52 is grasped by the pair of solenoid-operated clamps 92 mounted on the pusher carriage 80. Thereafter, automatically, the slitter head control bar 60 is raised, the reversible motor 102 is energized, and the pusher carriage 80 starts to move forward toward the sectioning apparatus 56. Movement of the carriage 80 advances the lead edge of substrate 32 into position above the hardened roll 68. The slitter head control bar 60 next is lowered so that blades 66 are in contact with roll 68, as seen in FIG. 4, to engage the lead edge of substrate 32. Once the package assembly 52 is engaged between the blades 66 and the hardened roll 68, which is driven by motor 74 independently of the pusher carriage 80, the hardened roll 68 will commence pulling the assembly through the sectioning apparatus 56. Clamps 92 will brace the trailing edge 114 so that the substrate 32 will not slide relative to the cutting blades as the sectioning operation is performed. In order to prevent buckling of the substrate 32, the speed of the hardened roll 68 will be slightly greater than the infeed speed of the pusher carriage 80, the result being that the package assembly 52 is retained in tension during the sectioning operation. The pusher carriage 80 is coupled to the torque motor 102 which responds to the amount of force being exerted back against the carriage 80 during cutting of the substrate. Thus, if a force in excess of that determined to maintain the substrate flat is applied against the carriage 80, there results a play or movement in the carriage 80 which prevents the otherwise resulting buckling of the substrate 32.

In addition to slitting the composite package 52 in a longitudinal direction by the slitters 64, the invention contemplates intermittent transverse sectioning to produce an individual or discrete package for each strategically positioned article 46. For this purpose, the substrate sectioning apparatus employs a transverse slitter member 116 having a slitter blade 118 mounted thereon in the same fashion as in connection with slitter members 64. The transverse slitter member 116 traverses the package 52 perpendicular to the path of travel of the said package and is operable to complete severing of the original composite package into a plurality of individual packages. Transverse slitter member 116 is secured to a continuous chain belt 120 which forms a rectangular-shaped configuration as best seen in FIG. 4. Guide gears 122 and a drive gear 124 are provided in each corner of the belt formation 120 and a drive motor 126 is connected by a pulley belt 128 to drive the gear 124 and the chain 120.

A relay circuit, as described below, and the program bar 108, controls the operation of the transverse slitter member 116. The cam follower 130 on cam-operated switch 112 engages against the program bar 108. As the pusher carriage 80 advances toward the sectioning apparatus 56, the switch 112 is tripped when it comes in contact with each of the cams 110. Upon being tripped by contact with the first cam 110, movement of the pusher carriage 80 is interrupted by the brake clutch arrangement 104, 106 and the transverse slitter member 116 is actuated to traverse substrate 32.

It is to be noted that the cam members 110 are adjustable along the length of the program bar 108 so that the timing of movement of the transverse slitter 116 can be varied.

Once the transverse slitter member 116 has completed its traversal across the package assembly 52, the infeed circuit is again closed and the pusher bar 80 will move forward until the cam-operated switch 112 engages a second cam along the program bar 108 which will again stop the carriage 80 and actuate the cross slitter 116.

Looking now at FIG. 5, the schematic diagram shows the operation of the cross slitter 116, the linear slitters 64, the roller 68, and the pusher carriage 80. To activate the system, the push button switch 132 is closed and power thereby is applied to motor 70 to commence rotation of roller 68. Power thereby is also applied to the switch 112 and the push button switch 136. Next, the switch 136 manually is closed to commence the operating cycle. Closing of the switch 136 causes lowering of the slitter head 60 and commences forward motion of the pusher carriage 80. Upon commencement of motion of the carriage 80, switch 138 is tripped causing the clamps 92 of the pusher carriage to move and firmly grip the substrate 32. The pusher carriage 80 commences movement parallel to the program bar 108 until the switch 112 comes in contact with the first cam 110 to trigger the switch 112. Triggering of the switch 112 activates relay 140. Relay 140 has three control functions related to the cross slitter 116, the clutch 106, and the brake 104. The relay 140 initiates a right-to-left movement of the cross slitter 116 as viewed in FIG. 4, the commencement of which movement initially trips a switch 142. When the left "home" position of the cross slitter 116 is reached, switch 144 is tripped by the cross slitter 116. When both switches 142 and 144 are tripped, the cross slitter 116, then being in the far left position, the relay 140 is caused to change its state via the "open" line 146. While the cross slitter is traversing from right to left, the relay 140 also is controlling the operation of the clutch 106 and brake 104 to deenergize the clutch and energize the brake thereby preventing movement of both the roller 68 and the carriage 80 during the cross-slitting operation. At the end of the cross-slitting operation, when the relay 140 is opened, the clutch 106 and brake 104 reverse their states and the roller and carriage again are enabled to move the substrate 32 to the next cross-slitting position as determined by the program bar 108. During this time, the pusher carriage switch 112 is advanced with respect to the program bar. When the next cam 110 is reached by switch 112, the switch 112 again is tripped and the conditions of the switches 142, 144 are reversed from their initial state. When the switches 142, 144 are tripped the second time, they actuate the relay 148 to cause the cross slitter 116 to operate in the reverse direction until the cross slitter reaches the far right position to open the relay 148. Accordingly, the clutch 106, brake 104, roller 68 and pusher carriage 80 respond the same way to either the relay 148 or the relay 140; whereas, the cross slitter 116 is operated in one direction by relay 148 and in the other direction by relay 140.

Eventually, the pusher carriage 80 has advanced the longitudinal distance of the slitter infeed station 28 to the end of the desired cross slitting positions. At this time the pusher carriage 80 trips the switch 150 which causes the slitter head 60 to rise and the pusher carriage to reverse its direction. The switch 150 also disables electrical effects of the switch 112 so that there is no programming function as that switch passes in reverse direction with reference to the program bar 108. The pusher carriage 80 will then be in position for the next cycle of operation and as soon as the next composite skin-package assembly 52 is completed and moved forward on to the infeed station 28, the operation can be repeated.

In practice, the overall control system for the entire machine would include various elements such as timers, relays, switches and other circuitry which would control and provide sequence of operation as described and these elements of the control system may be adjusted to attain the desired timing and length of operating cycle.

What it is desired to secure by Letters Patent of the United States is:

I claim:

1. In a machine for packaging a plurality of articles between a substrate member and a thermoplastic film vacuum-formed over the articles and laminated to the substrate to provide a composite skin package, said machine including a vacuum bed and means for removing the composite package from the vacuum bed to a package-removal station, the invention comprising package-trimming apparatus for sequential operation with said machine including, package-advancement means slidably mounted to move from a first position on said package-removal station adjacent said vacuum bed to a second position at the opposite end of said package-removal station, said package-advancement means having means extending above the upper surface of said package-removal station to clamp and brace said package at the trailing edge thereof adjacent said vacuum station, package-sectioning means mounted on said package-removal station adjacent said second position, said package-advancement means constructed and arranged to advance said trailing edge from said first position to said second position for sectioning said composite package into individual package units, said package-advancement means including package-advancement control means responsive to the amount of force exerted back against said package-advancement means to prevent buckling of said substrate during advancement and sectioning of said composite package.

2. Apparatus claimed in claim 1 in which said package-advancement means includes guide means extending the length of said package-removal station between said first and second positions, a pusher carriage slidably mounted on said guide means, drive means coupled to said pusher carriage, and a motor coupled to said drive means for actuating same.

3. Apparatus as claimed in claim 2 in which said clamp and brace means includes upstanding extensions on said pusher carriage and vertically movable clamp members mounted in said extensions.

4. Apparatus as claimed in claim 1 in which said package-sectioning means includes a hardened roll positioned adjacent said second station, means to drive said roll independently of said package-advancement means, a slitter head control bar mounted for vertical movement above said roll, and a plurality of longitudinal slitter members carried on the underside of said control bar substantially parallel to the longitudinal axis of said machine.

5. Apparatus as claimed in claim 4 in which said longitudinal slitter members are circular.

6. Apparatus as claimed in claim 4 in which said package-sectioning means includes intermittent transverse sectioning means comprising a transverse slitter member mounted above said roll, a transverse slitter blade mounted on said transverse slitter member adjacent said roll facing substantially normal to the longitudinal axis of said machine, and program and control means to control overall movement of said transverse slitter member, said carriage, said motor and said roll.

7. Apparatus as claimed in claim 6 in which said transverse slitter blade is circular.

8. Apparatus as claimed in claim 6 in which said program and control means comprise brake means on said pusher carriage and clutch means on said motor, said brake and clutch means adapted to control starting and stopping of said carriage and motor and said roll.

9. Apparatus as claimed in claim 6 in which said program and control means includes a program control bar mounted parallel to the path of travel of said pusher carriage, a cam-operated switch follower extending from the side of said pusher carriage in contact with said program control bar, and cam members mounted on said program control bar in line with the path of travel of said switch follower whereby when said switch follower contacts each of said cam members, said pusher carriage and roll will be stopped and said transverse slitter member will be activated.

10. Apparatus as claimed in claim 9 in which said cams are adjustable in position one relative to the other along said program control bar.

References Cited
UNITED STATES PATENTS

Re. 25,466  10/1963  Kostur _____ 53—112
3,387,426  6/1968  Kraut et al. _____ 53—112X TRAVIS S. McGEHEE, Primary Examiner U.S. Cl. X.R.
83—278, 408